US009660983B2

(12) United States Patent
Sama (10) Patent No.: US 9,660,983 B2
(45) Date of Patent: May 23, 2017

(54) COUNTER SETS FOR COPIES OF ONE TIME PASSWORD TOKENS (71) Applicant: CA, Inc., New York, NY (US)

(72) Inventor: Venkatababji Sama, Bangalore (IN)

(73) Assignee: CA, INC., New York, NY (US)

( * ) Notice: Subject to any disclaimer, the term of this patent is extended or adjusted under 35 U.S.C. 154(b) by 62 days.

(21) Appl. No.: 14/523,308

(22) Filed: Oct. 24, 2014

(65) Prior Publication Data

US 2016/0119331 A1 Apr. 28, 2016

(51) Int. Cl.
*H04L 29/06* (2006.01)
*H04L 9/32* (2006.01)
*G06F 21/31* (2013.01)
*G09C 1/00* (2006.01)
*H04L 9/08* (2006.01)

(52) U.S. Cl.
CPC .......... *H04L 63/0838* (2013.01); *G06F 21/31* (2013.01); *G09C 1/00* (2013.01); *H04L 9/0877* (2013.01); *H04L 9/3228* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,572,684 B1 * | 10/2013 | Sama | .................... | H04L 9/3228 726/2 |
| 8,799,655 B1 * | 8/2014 | Dotan | ................... | H04W 12/06 380/270 |
| 2002/0087860 A1 * | 7/2002 | William Kravitz | ..... | G06F 21/10 713/168 |
| 2004/0230831 A1 * | 11/2004 | Spelman | ................. | G06F 21/33 726/8 |

(Continued)

OTHER PUBLICATIONS

CA Technologies, "CA ArcotID OTP Versatile Authentication Solution for Mobile Phones," downloaded from the Internet on Oct. 20, 2014, 4 pages, [http://www.ca.com/~/media/Files/ProductBriefs/ca-arcotid-otp-versatile-authentication-solution.pdf].

(Continued)

*Primary Examiner* — Taghi Arani
*Assistant Examiner* — Phy Anh Vu
(74) *Attorney, Agent, or Firm* — Vierra Magen Marcus LLP (57) ABSTRACT One time password (OTP) technology enables a plurality of OTP software token instances (or copies) to be used simultaneously on a plurality of computing devices of a user. OTP software instances may be counter based. An authentication server comprising authentication software assigns a set of counters for each OTP software instance. An OTP software instance may be provided along with the assigned set of counters to each computing device. A range of counters may be partitioned by the authentication server into mutually (Continued)

exclusive sets of counters. An OTP software instance executed by a computing device uses one of the counters in the assigned set of counters to provide an OTP. The authentication server attempts authentication by using each counter in the assigned set of counters to provide a calculated OTP that is compared to the received OTP. The authentication server verifies authenticity when a calculated OTP matches a received OTP.

15 Claims, 8 Drawing Sheets

(56) References Cited

U.S. PATENT DOCUMENTS

| | | | |
|---|---|---|---|
| 2006/0080545 A1* | 4/2006 | Bagley | H04L 63/083 713/183 |
| 2006/0083228 A1* | 4/2006 | Ong | G06F 21/34 370/389 |
| 2006/0107323 A1* | 5/2006 | McLean | G06F 21/33 726/23 |
| 2007/0220597 A1* | 9/2007 | Ishida | G06Q 20/12 726/8 |
| 2007/0234064 A1* | 10/2007 | Nihei | G06F 21/34 713/183 |
| 2007/0245150 A1* | 10/2007 | Lu | G06F 21/31 713/184 |
| 2009/0210720 A1* | 8/2009 | Chen | G06F 21/46 713/180 |
| 2010/0263029 A1* | 10/2010 | Tohmo | H04L 9/0863 726/6 |
| 2011/0113245 A1* | 5/2011 | Varadarajan | G06F 21/34 713/168 |
| 2011/0276495 A1* | 11/2011 | Varadarajan | G06F 21/31 705/71 |
| 2012/0233675 A1* | 9/2012 | Hird | H04L 63/0838 726/6 |
| 2012/0233684 A1* | 9/2012 | Denis | G06F 21/335 726/9 |
| 2014/0282935 A1* | 9/2014 | Lal | G06F 21/72 726/6 |
| 2016/0065370 A1* | 3/2016 | Le Saint | H04L 9/0841 713/155 |

OTHER PUBLICATIONS

CA Technologies, "CA ArcotOPT Versatile Authentication Solution for Mobile Phones," downloaded from the Internet on Oct. 20, 2014, 7 pages. [http://www.ca.com/~/media/Files/ProductBriefs/ca_arcototp_for_mobile_authentication_product_sheet.pdf].

Siptrunkingreport Contributor, "Arcot and MasterCard Join Forces to Unveil ArcotOTP Mobile Authentication Application," Jan. 18, 2010, 4 pages, [http://sip-trunking.tmcnet.com/topics/security/articles/72960-arcot-mastercard-jo-forces-unveil-arcototp-mobile-authentication.htm].

* cited by examiner

COUNTER SETS FOR COPIES OF ONE TIME PASSWORD TOKENS

BACKGROUND

The present disclosure relates to communicating between computing devices, and in particular accessing a protected service, such as an application, from a computing device.

Users generally use multiple computing devices like desktops, laptops, tablets, mobile phones etc. to access an application. At times, a user may uses these computing devices simultaneously or in tandem. A user may use one computing device at the office and another computing device at home. Typically, a computing device may have to be authenticated before access is allowed. A user may provide a username and password during a login in order to access the application. The password may be a static password or a password that does not change unless the password expires, changed by a user or changed by an administrator.

Unlike static passwords, one time password (OTP) technology may provide a different or dynamically changing password each time a user attempts to access an application. OTPs may be generated by hardware and/or software.

BRIEF SUMMARY

According to an aspect of the disclosure, a method to authenticate comprises a computing device receiving a request for a one time password (OTP) value and selecting a counter from a set of counters to use in calculating the OTP value. A key value is retrieved as well as a counter value from the selected counter. The computing device calculates the one time password in response to the selected counter value and the key value and outputs the OTP value.

According to another aspect of the disclosure, an apparatus comprises a processor and a computer readable storage medium to store computer readable program code. The computer readable program code configures the processor to: 1) assign sets of counters to a plurality of computing devices; 2) receive a one time password value from a computing device in the plurality of computing devices; 3) select a counter in a set of counters assigned to the computing device in the plurality of computing devices; 4) obtain a counter value from the counter; 5) obtain a key value; 6) calculate a calculated one time password in response to the selected counter value and the key value; 7) compare the calculated one time password with the received one time password; and 8) output an authentication token when the calculated one time password value matches the received one time password value.

According to another aspect of the disclosure, a computer program product comprises a computer readable storage medium having computer readable program code embodied therewith. The computer readable program code comprises: 1) computer readable program code configured to partition a range of counters into a plurality of sub-ranges of counters; 2) computer readable program code configured to associate a computing device with a sub-range of counters in the plurality of sub-ranges of counters; 3) computer readable program code configured to output the sub-range of counters to the computer device; 4) computer readable program code configured to receive a one time password value from the computing device, the one time password value calculated by the computing device using a key and a counter value from a counter in the sub-range of counters; 5) computer readable program code configured to provide a calculated one time password value in response to the key value and a counter value from one of the counters in the sub-range of counters; and 6) computer readable program code configured to authenticate the computing device in response to comparing the one time password value from the computing device with the calculated one time password value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

One time password (OTP) technology enables a plurality of OTP software token instances (or copies) to be used simultaneously on a plurality of computing devices of a user in an embodiment. OTP software instances may be counter based. An authentication server comprising authentication software assigns a set of counters for each OTP software instance from sets of counters. An OTP software token instance may be provided along with the assigned set of counters to each computing device. Sets of counters or a range of counters may be partitioned by the authentication server into mutually exclusive sets of counters. An OTP software token instance executed by a computing device uses one of the counters in the assigned set of counters to provide an OTP value. The authentication server attempts authentication by using each counter in the assigned set of counters to provide a calculated OTP value that is compared to the received OTP value. The authentication server verifies authenticity when a calculated OTP value matches a received OTP value.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated signal with computer readable program code embodied therein, for example, in baseband or as part of a carrier wave.

Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, Radio Frequency (RF), etc., or any suitable combination of the foregoing.

Computer (readable) program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
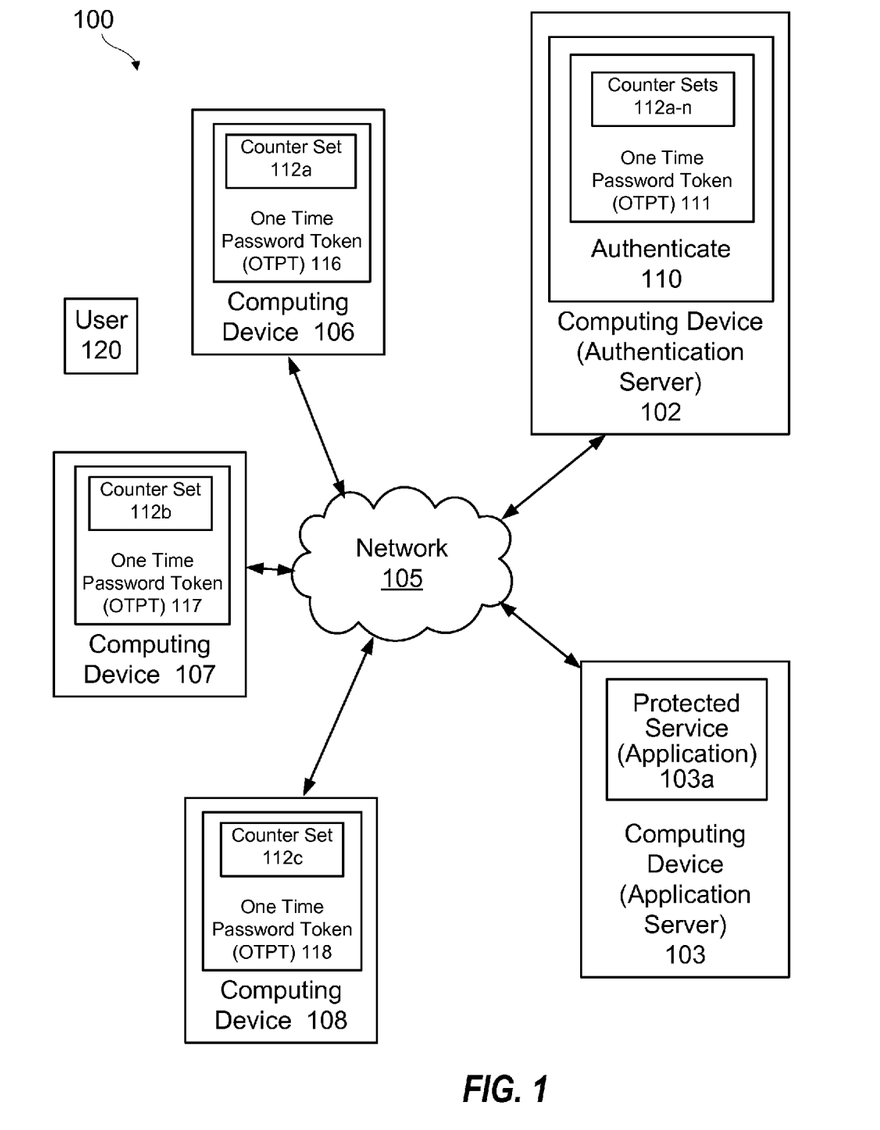
FIG. 1 illustrates a high-level block diagram of an apparatus or system comprising computing devices using a one time password (OTP) technology according to an embodiment.

FIG. 1 is a high-level block diagram of an apparatus (or system) 100 comprising networked computing devices to provide OTP technology as described herein. In an embodiment, a system 100 includes a plurality of computing devices 106-108 having one time password tokens (OTPTs) 116-118 to calculate OTP values for authentication. In embodiments, OTPTs 116-118 includes mutually exclusive counter sets 112$a$-$c$, respectively. In an embodiment, copies of counter sets 112$a$-$c$ are downloaded with OTPTs 116-118 from computing device 102 to respective computing devices 106-108. In an embodiment, selected counters in each of the counters sets 112$a$-$c$ provide count values used to calculate respective OTP values. In an embodiment, OTP values are output to a computing device, such as computing device 102, for authentication and/or an authentication token.

In an embodiment, computing device 102 may be an authentication server having authenticate 110 with OTPT 111 including counter sets 112$a$-$n$. One of the counter sets in counter sets 112$a$-$n$ may be assigned or associated with one of the computing devices 106-108 (or OTPTs 116-118). One of the assigned or associated counter sets in counter sets 112$a$-$n$, in particular a selected counter in the assigned counter set, may be used to authenticate a particular computing device. Authenticating a computing device may include comparing a received OTP value from one of computing devices 106-108 with an OTP value calculated by OTPT 111 using a count value from one of the counters in the associated counter set of counter sets 112$a$-$n$.

As illustrated in FIG. 1, user 120 may use one or more computing devices 106-108 to use or access protected service 103$a$, such as an application. In an embodiment, a protected service 103$a$ is provided by a computing device 103, such as an application server. At times, user 120 may uses two or more computing devices 106-108 simultaneously or in tandem. In embodiments, computing devices 106-108 may be, but are not limited to, a desktop computer, netbook computer, laptop computer, tablet computer, mobile telephone (or smartphone), personal digital assistant, watch computer, wearable computer, mainframe, embedded system and/or similar computing device having a processor to execute (or read) computer readable program code on a computer readable media. Before one or more computing devices 106-108 accesses a protected service, the one or more computing devices 106-108 may be authenticated, by for example, computing device 102.

In embodiments, OTPTs 116-118 and authenticate 110 including OTPT 111 are computer readable program code executed (or read) by respective computing devices (or processors) shown in FIG. 1. Similarly, protected service 103a, such as an application, is computer readable program code executed by computing device 103 (or a processor of computing device 103). In an embodiment, computing device 103 embodied as an application server provides a service and/or information to one or more of computing devices 106-108 in response to a request and authentication.

In embodiments, computing devices illustrated in FIG. 1 have user interfaces to access the respective computing devices. In embodiments, a user interface includes computer readable program code as well as hardware components. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where a user 120 may speak, touch or gesture to a user interface to provide input.

In embodiments, system 100 includes many more or less computing devices. In an embodiment, computing devices 102 and 103 are combined into a single computing device. In embodiments, functions described herein are distributed to other or more computing devices.

In embodiments, one or more computing device illustrated in FIG. 1 may act as a server while one or more computing devices may act as a client. In an embodiment, one or more computing devices may act as peers in a peer-to-peer (P2P) embodiment.

Computing devices illustrated in FIG. 1 communicate or transfer information by way of network 105. In an embodiment, network 105 may be the Internet, a WAN or a LAN, singly or in combination. In an embodiment, computing devices illustrated in FIG. 1 use one or more protocols to transfer information, such as Transmission Control Protocol/Internet Protocol (TCP/IP). In embodiments, computing devices illustrated in FIG. 1 include input/output (I/O) computer readable program code as well as hardware components, such as I/O circuits to receive and output information from and to other computing devices, via network 105. In an embodiment, an I/O circuit may include a transmitter and/or receiver circuit.

Figure 2:
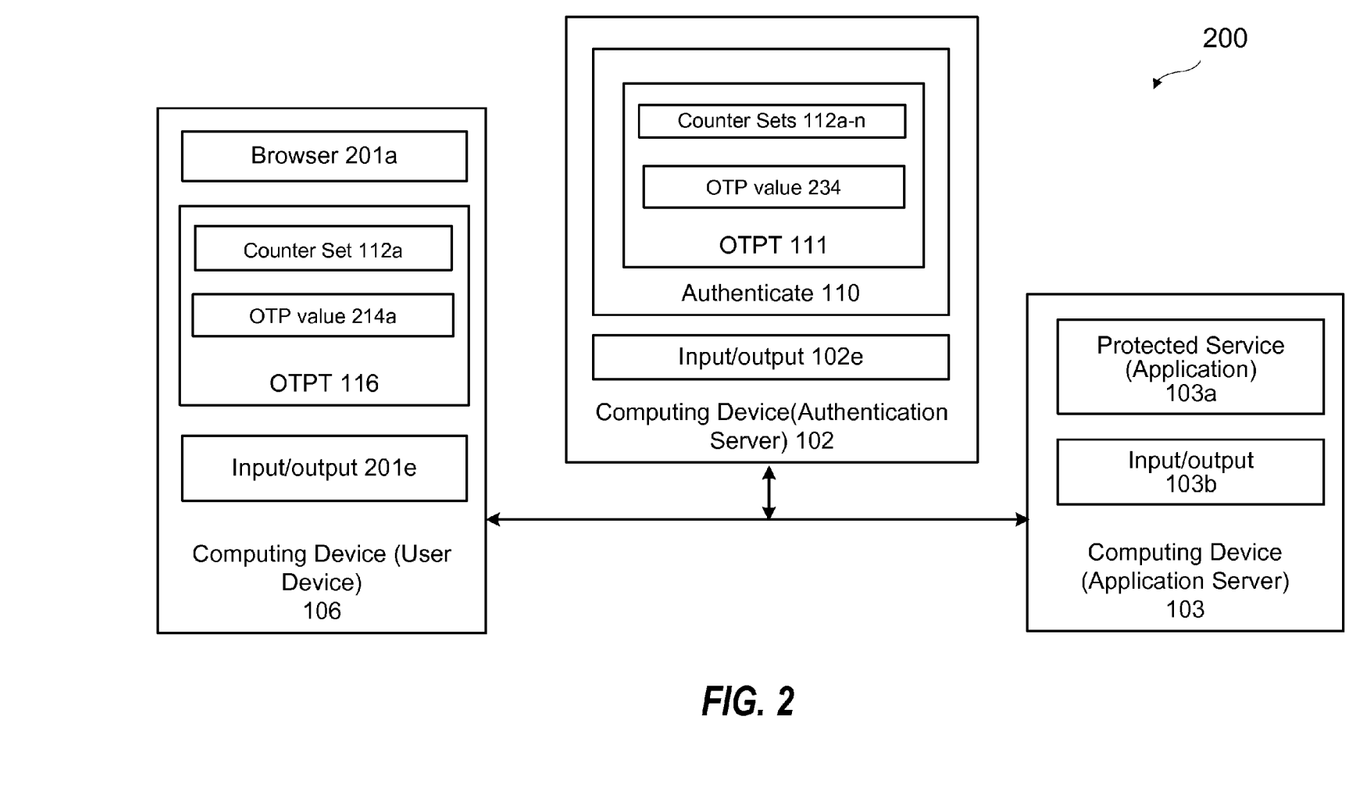
FIG. 2 illustrates a software architecture for the apparatus shown in FIG. 1 according to an embodiment.
Figure 3:
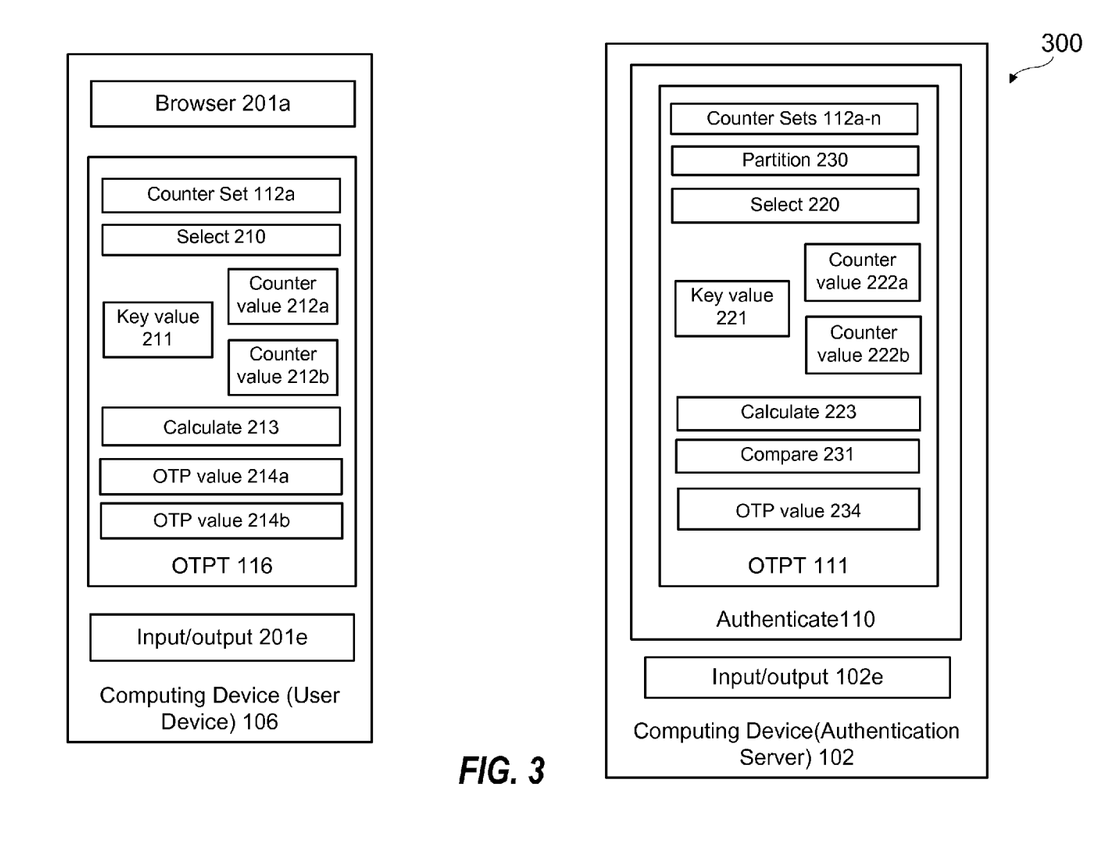
FIG. 3 illustrates a software architecture for a computing device, such as a user computing device, and another computing device, such as authentication server, according to an embodiment.

FIGS. 2 and 3 illustrates software architectures 200 and 300 for system 100 shown in FIG. 1 according to embodiments. In an embodiment, computing device 106 is embodied as a user device and may also correspond to one or more computing devices 107-108 shown in FIG. 1. Software architectures 200 and 300 illustrate computer readable program code or instructions (or portions thereof) to provide an OTP technology described herein. In embodiments, one or more processors execute (or read) computer (or processor) readable code to provide at least portions of an OTP technology that authenticates computing devices using respective copies of counter sets.

In embodiments, computer readable program code illustrated in FIGS. 2 and 3 may be embodied as a software program, software object, software function, software subroutine, software method, software instance, script and/or a code fragment, singly or in combination. In order to clearly describe the technology, computer readable program code shown in FIGS. 2 and 3 is described as individual software components or components. In embodiments, the software components illustrated in FIGS. 2 and 3, singly or in combination, may be stored (in computer readable storage medium(s)) and/or executed by a single or distributed computing device (processor) architecture. As one of ordinary skill in the art would understand, the functions performed by the various software components described herein are exemplary. In other embodiments, software components identified herein may perform more or less functions.

In embodiments, computing device 106 includes, one or more of, a browser 201a, OTPT 116 including counter set 112a and OTP value 214a and input/output 201e software components.

Figure 4:
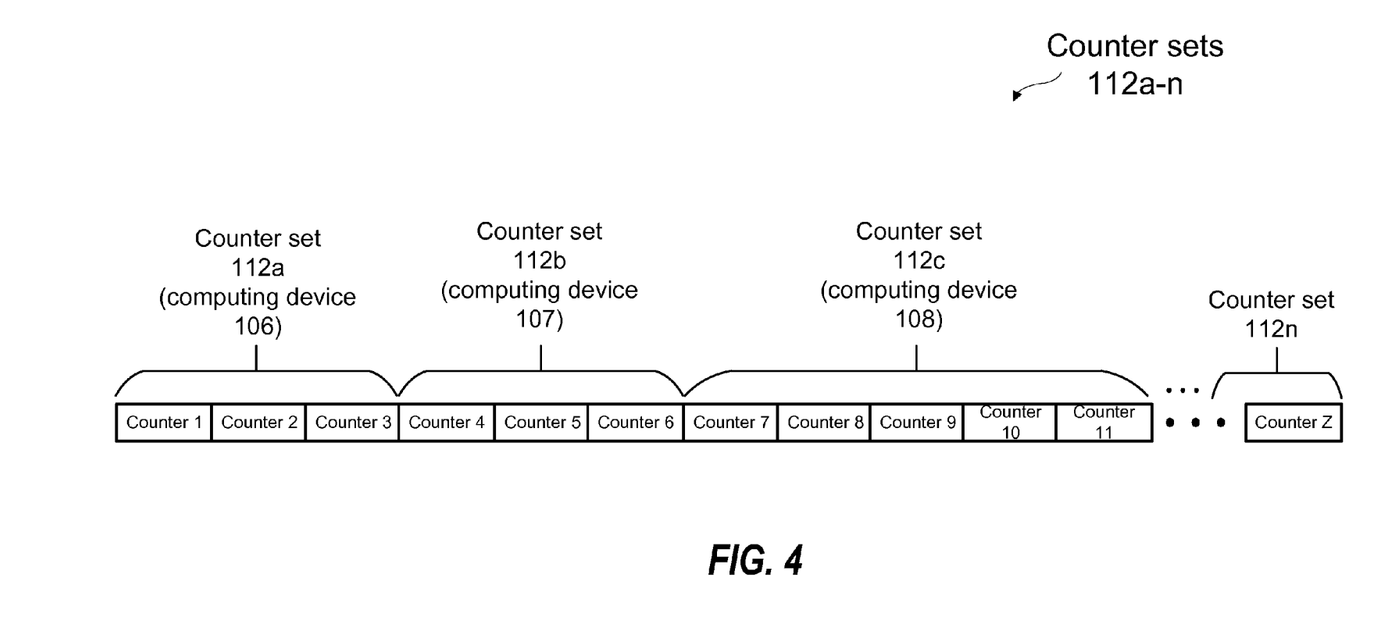
FIG. 4 illustrates partitioning sets of counters according to an embodiment.

Browser 201a is responsible for accessing and/or retrieving information or a service in an embodiment. In an embodiment, browser 201a accesses protected service 103a after obtaining at least an authentication token. In an embodiment, browser 201a is computer readable program code with a graphical user interface for displaying Hyper Text Markup Language (HTML) files, used to navigate an Internet or intranet. In an embodiment, counter set 112a includes a copy of a plurality of counters as illustrated in FIG. 4 and described herein. In an embodiment, OTP value 214a is a calculated by OTPT 116 using a counter value from a selected counter in counter set 112a as described herein. Input/output 201e is responsible for transferring information to and from computing device 106, including OTP value 214a to computing device 102.

In embodiments, computing device 102 includes, one or more of, OTPT 111 including counter sets 112a-n and OTP value 234 and input/output 102e software components. In an embodiment, counter sets 112a-n includes sets of counters as illustrated in FIG. 4 and described herein. In an embodiment, OTP value 234 is a calculated by OTPT 111 using a counter value from an associated counter set, such as counter set 112a in counter sets 112a-n, as described herein. In an embodiment, calculated OTP value 234 is compared to a received OTP value 214a to determine whether to authenticate computing device 106. Input/output 201e is responsible for transferring information to and from computing device 102, including receiving OTP value 214a and outputting an authentication token.

In embodiments, computing device 103 includes, one or more of, protected service 103a and input/output 103b software components. Input/output 103b is responsible for transferring information to and from computing device 103, such as outputting information from protected service 103a to computing device 106.

FIG. 3 illustrates a detail software architecture 300 of computing device 106 and computing device 102. In particular, a detailed software architecture embodiment of OTPTs 116 and 111 is illustrated in FIG. 3.

In an embodiment, counter set 112a of OTPT 116 is a copy of counter set 112a in counter sets 112a-n of OTPT 111 as illustrated in FIGS. 1-4.

Select 210, in an embodiment, is responsible for selecting a counter from counter set 112a to provide a counter value, such as counter values 212a-b, used by calculate 213 to calculate an OTP value, such as OTP values 214a-b. In an embodiment, select 210 may select different counters from counter set 112a to obtain different counter values in a round robin, sequentially and/or random manner in embodiments.

In an embodiment, key value 211 is a multi-bit cryptographic value stored in in computer readable storage media of computing device 106 used by calculate 213 to calculate an OTP value. In an embodiment, key value 211 is provided by computing device 102. In an embodiment, key value 211 is a copy of key value 221 stored in computer readable storage media of computing device 102.

In an embodiment, calculate 213 calculates and outputs an OTP value in response to a key value and counter value input. As one of ordinary skill in the art would appreciate, different types of counter based OTP calculation methods and/or computer readable program code may be used.

In an embodiment of authenticate 110, counter sets 112a-n in OTPT 111, is described herein and illustrated in FIG. 4. Copies of counter sets in counter sets 112a-n are downloaded with respective instances of an OTPT to respective computing devices as described herein. Similarly, assigned counter sets in counter sets 112a-n are used by calculate 223 to calculate OTP value 234, or a calculated OTP of computing device 102.

In an embodiment, partition 230 is responsible for partitioning or portioning a range or plurality of counters into counter sets that are assigned or associated to respective computing devices as illustrated in FIG. 4 and described herein.

Select 220, in an embodiment, is responsible for selecting a counter in an associated counter set of counter sets 112a-b to provide a counter value, such as counter values 222a-b. In an embodiment, select 220 operates similar to select 210.

Key value 221 is store in computing device 102 similarly as key value 211. In an embodiment, key value 221 is the same as key value 211.

Calculate 223 calculates an OTP value, such as OTP value 234, in response to a key value 221 and one of counter values 222a-b from a selected counter in an associated counter set, such as counter set 112a in counter sets 112a-n of computing device. In an embodiment, calculate 223 is the same as calculate 213.

Compare 234 compares a calculated value, such as OTP value 234, with a received OTP value, such as one of OTP values 214a-b, and determines whether a match is made between the values. When a match of values occur, an authentication token, such as a security assertion markup language (SAML) token is output to the processing device, such as processing device 106, by input/output 102e, which requested authentication. When a match of values does not occur, a different counter value of a different counter in the associated set of counters (for example counter set 112a assigned to computing device 106) is used to calculate OTP value 234 and compare with a receive OTP value in order to determine whether to output a authentication token. The process repeats until a match occurs or all of the counter values in the associated counter set is used to calculate OTP value 234. When all the count values are used from the associated counter set (for example from counter set 112a) to determine a calculated OTP value and no match occurs, an error or non-authentication message may be output.

FIG. 4 illustrates partitioning (or assigning, associating, allotting) sets of counters according to embodiments. In an embodiment, counter sets 112a-n are partitioned into mutually exclusive sets of counters, such as counter set 112a, counter set 112b, counter set 112c, etc. In an embodiment, each set of counters includes enough counters to be used for a predetermined number of authentications. In an embodiment, when an instance (or copy) of a OTPT (or software component) is requested for download, the instance OTPT is allotted a unique counter set (or set of counters) before downloading the instance OTPT to the requesting computing device. In an embodiment, each instance of the OTPT operates on the associated counter set and calculates an OTP value during authentication attempts. When an authentication server receives the OTP value, authentication or verification of the received OTP value by the authentication server is attempted by using a counter value from each counter in the associated counter set until a match is made or all the counter values from all the counters in the associated counter set for the computing device does not result in a match.

In an embodiment a range of counter sets 112a-n may be partitioned into multiple continuous or contiguous sub-ranges of equal width or size (or number) before a request for an instance of an OTPT (or authentication request) is made. For example counter sets 112a and 112b are partitioned from counter sets 112a-n into contiguous sub-ranges of counters (counter set 112a includes counter 1, counter 2 and counter 3; counter set 112b includes counter 4, counter 5 and counter 6). When computing devices 106 and 107 request an instances of an OTPT, counter sets 112a and 112b are then are assigned (or associated with computing devices 106 and 107) and downloaded with respective OTPT instances.

In an alternate embodiment, at about a time of downloading an OTPT, a set of counters may be partitioned having a selectable predetermined number or size from a range of counters, such as counters sets 112a-n. For example, counter set 112c may be assigned at the time of downloading an instance of the OTPT to computing device 108. In an embodiment, counter set 112c has a selectable number of counters, such as five counters: counter 7, counter 8, counter 9, counter 10 and counter 11. A selectable predetermined size of counters may be relatively small when an instance of an OTPT is downloaded for temporary use.

In an alternate embodiment, range of counter sets may be partitioned or assigned into mutually discrete sets of counters by using a generator function, such as 2g(even), 2g+1 (odd). In still another embodiment, a sub-range of counters or a counter set from counter sets 112a-n may be partitioned or assigned to two instances of an OTPT. A first instance of an OTPT may use counters from a beginning toward an end (for example, counter 7, counter 8 . . . in counter set 112c) and a second instance of the OTPT may use counters from an end toward a beginning (for example, counter 11, counter 10 . . . in counter set 112c).

In an embodiment, OTP technology described herein may be used for synchronous one time password tokens as well as by assigning different time offsets for each one time password token.

Figure 5:
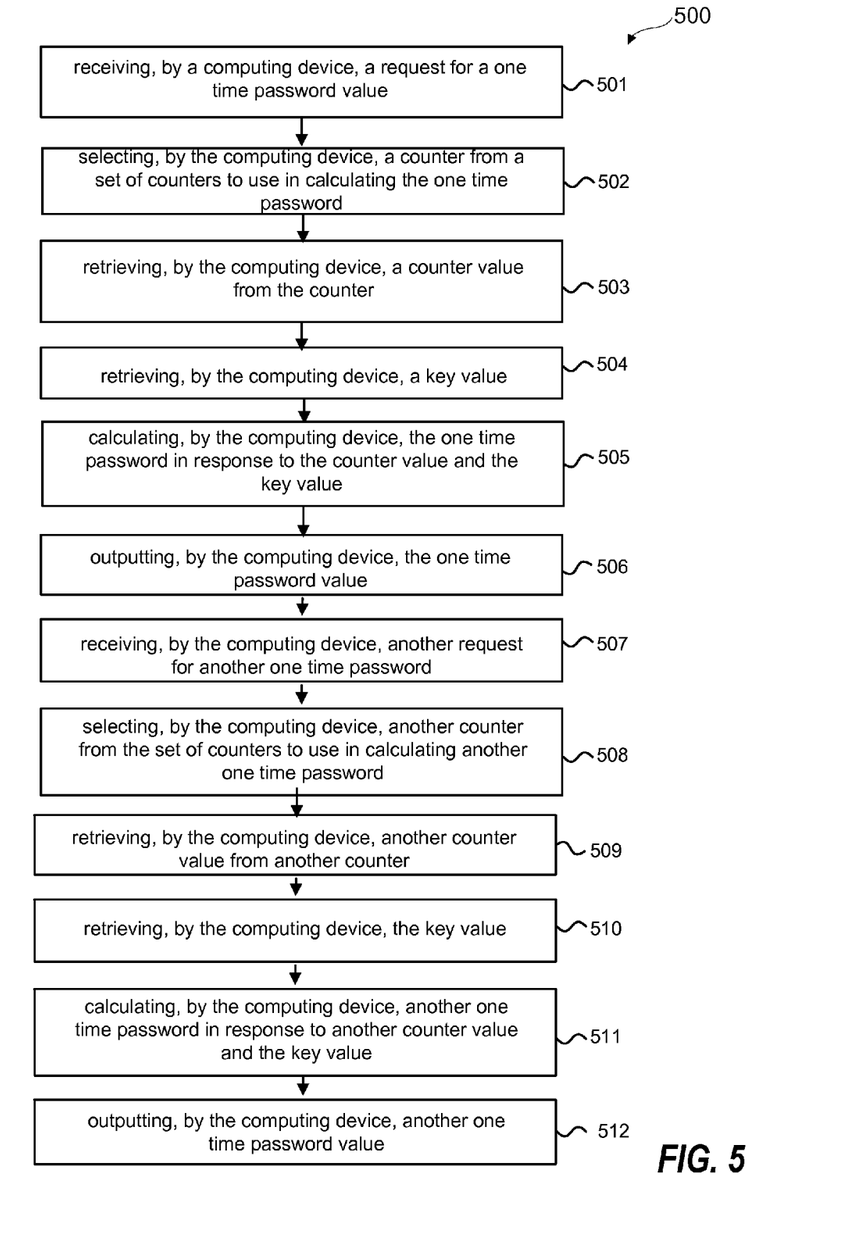
FIG. 5 illustrates a flowchart of an OTP method according to an embodiment.

FIG. 5 illustrates a flowchart of an OTP method 500 according to an embodiment. In an embodiment, one or more computing devices 106-108 and 102-103 shown in FIG. 1 execute computer readable program code (or processor readable instructions), such as one or more software components shown in FIGS. 2 and 3, to perform at least portions of method 500.

Logic block 501 represents receiving, by a computing device, a request for a one time password value. In an embodiment, computing device 106 receives a request for an OTP, or an authentication request, after attempting to access protected service 103a, such as an application, from computing device 103. In an embodiment, computing device 103 is embodied as an application server that redirects or forwards a request to access from a computing device to computing device 102. In an embodiment, computing device 102 is embodied as an authentication server that makes a request for an OTP to the computing device that requested protected service 103a.

Logic block 502 represents selecting, by the computing device, a counter from a set of counters to use in calculating the one time password value. In an embodiment, OTPT 116 executed by computing device 106 performs this function. In an embodiment, select 210 selects a counter from counter set 112a in computing device 106 as illustrated in FIG. 3. In an embodiment, computing device 102 downloads counter set 112a to computing device 106. Computing device 102 also associates (or assigns in computer readable storage media of computing device 102) counter set 112a stored in computing device 106 with computing device 106 in an embodiment.

Logic block 503 represents retrieving, by the computing device, a counter value from the counter. In an embodiment, OTPT 116 executed by computing device 106 performs this function. In an embodiment, OTPT 116 retrieves a counter value 212a from the selected counter of counter set 112a as illustrated in FIG. 3. In an embodiment, counter value 212a may be stored in a computer readable storage medium of computing device 106.

Logic block 504 represents retrieving, by the computing device, a key value. In an embodiment, OTPT 116 executed by computing device 106 performs this function. In an embodiment, OTPT 116 retrieves a key value 211 as illustrated in FIG. 3. In an embodiment, key value 211 may be stored in a computer readable storage medium of computing device 116. In an embodiment, key value 211 is a cryptography key that may be provided to computing device 106 by computing device 102.

Logic block 505 represents calculating, by the computing device, the one time password in response to the counter value and the key value. In an embodiment, OTPT 116 executed by computing device 106 performs this function. In an embodiment, calculate 213 uses key value 211 and counter value 212a to calculate an OTP value 214a. In an embodiment, logic block 505 includes remembering or storing the counter used for obtain counter value 212a from the set of counters.

Logic block 506 represents outputting, by the computing device, the one time password value. In an embodiment, input/output 201e outputs OTP value 214a to computing device 102.

Logic block 507 represents receiving, by the computing device, another request for another one time password. In an embodiment, computing device 106 receives a request similar to logic block 501. In an embodiment, another request for another one time password is received in response to computing device 106 attempting to access another protected service (other than protected service 103a in an embodiment) that requires authentication. The requested another protected service may be provided by a computing device that is different than computing device 103 (or a different application server).

Logic block 508 represents selecting, by the computing device, another counter from the set of counters to use in calculating another one time password. In an embodiment, OTPT 116 executed by computing device 106 performs this function. In an embodiment, computing device 106 selects another counter similar to logic block 502. In an embodiment, select 210 selects another or different counter from counter set 112a than the counter selected in logic block 502. In an embodiment, select 210 may select different counters from counter set 112a to obtain different counter values in a round robin, sequentially and/or random manner in embodiments.

Logic block 509 represents retrieving, by the computing device, another counter value from another counter. In an embodiment, OTPT 116 executed by computing device 106 performs this function. In an embodiment, OTPT 116 retrieves a counter value 212b from the selected counter of counter set 112a as illustrated in FIG. 3. In an embodiment, counter value 212b may be stored in a computer readable storage medium of computing device 106.

Logic block 510 represents retrieving, by the computing device, the key value. In an embodiment, OTPT 116 retrieves a key value 211 as illustrated in FIG. 3. In an embodiment, key value 211 is the same key value as used in logic block 504.

Logic block 511 represents calculating, by the computing device, another one time password in response to another counter value and the key value. In an embodiment, OTPT 116 executed by computing device 106 performs this function. In an embodiment, calculate 213 uses key value 211 and counter value 212b to calculate an OTP value 214b. In an embodiment, logic block 511 includes remembering or storing the counter used for obtain counter value 212b from the set of counters.

Logic block 512 represents outputting, by the computing device, another one time password value. In an embodiment, input/output 201e outputs OTP value 214b to computing device 102.

Figure 6:
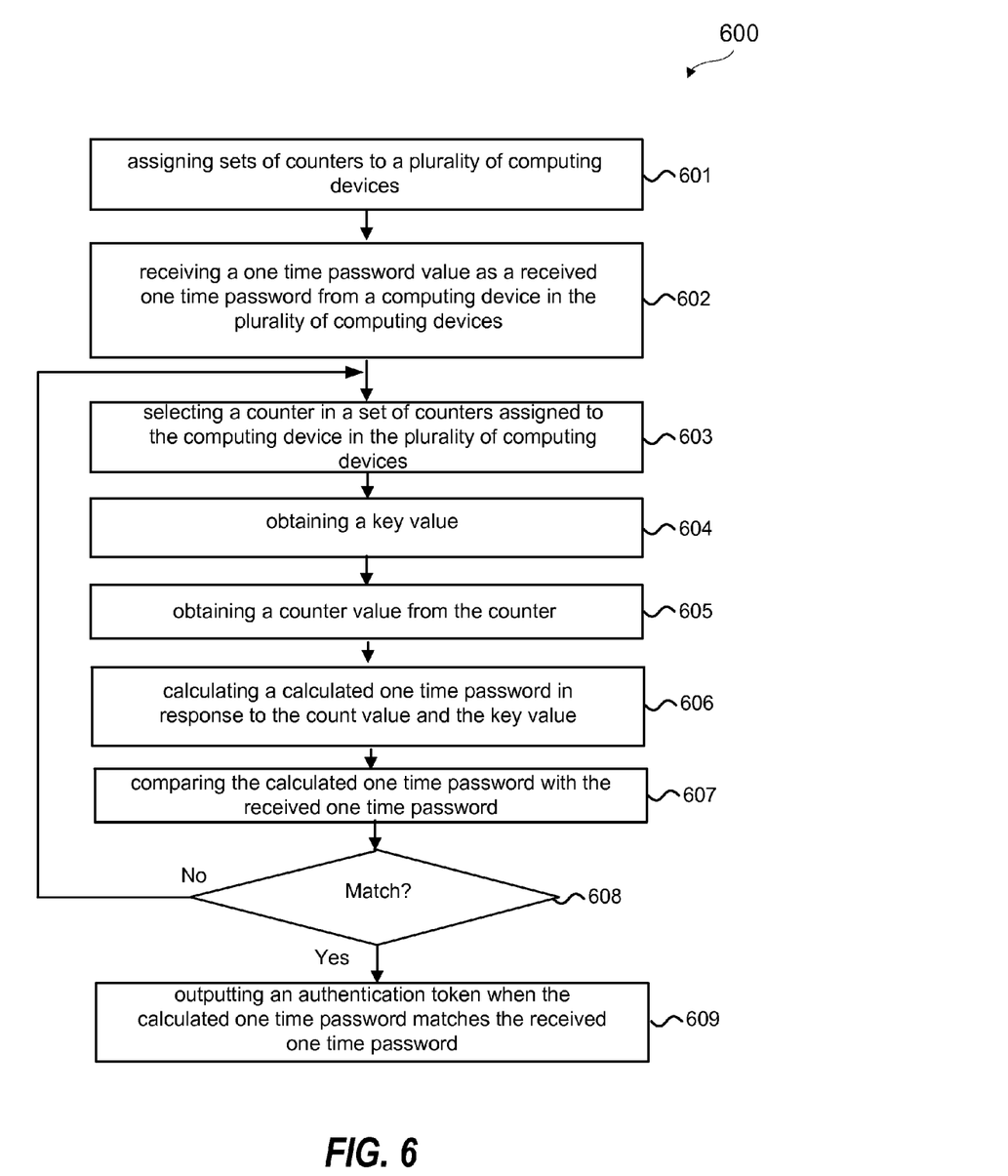
FIG. 6 illustrates a flowchart of an OTP method according to an embodiment.

FIG. 6 is a flowchart illustrating an OTP method 600 according to an embodiment. In an embodiment, computing device 102 shown in FIGS. 1-3 executes computer readable program code (or processor readable instructions), or portions thereof, to perform method 600. In an embodiment, computing device 102, embodied as an authentication server, performs method 600.

Logic block 601 illustrates assigning sets of counters to a plurality of respective computing devices. In an embodiment, authenticate 110 executed by computing device 102 performs this function. In an embodiment, partition 230 assigns or partitions counter sets 112a-n so that sets of counters are associated with particular computing devices that provide OTP values. For example, partition 230 assigns counter set 112a to computing device 106, counter set 112b to computing device 107 and counter set 112c to computing device 108 as illustrated in FIGS. 1 and 4. In an embodiment, counter set 112a is downloaded to computing device 106 along with OTPT 116, counter set 112b is downloaded to computing device 107 along with OTPT 117 and counter set 112c is downloaded with OTPT 118 to computing device 108. In an embodiment, a range of counter sets 112a-n maybe partitioned or associated into sub-ranges (or sets) having different widths or number of counters. For example, counter sets 112a and 112b comprises 3 counters in each respective set, while counter set 112c comprises 5 counters. In an embodiment, a relational database is formed and stored in a computer readable storage medium of computing device 102, by partition 230, so that respective stored computing device names or identifications are associated with or assigned to a mutually exclusive set of counters in counter sets 112a-n.

Logic block 602 illustrates receiving a one time password value as a received one time password from a computing device in the plurality of computing devices. In an embodiment, input/output 102e executed by computing device 102 performs this function. In an embodiment, OTP value 214a is received by computing device 102 from computing device 106

Logic block 603 illustrates selecting a counter in a set of counters assigned to the computing device in the plurality of computing devices. In an embodiment, authenticate 110, and in particular OTPT 111, executed by computing device 102 performs this function. In an embodiment, select 220 selects a counter in a counter set of counter sets 112a-n that corresponds or has been assigned to the computing device providing the received OTP value. For example, select 220 may select a counter in counter set 112a when computing device 106 provides an OTP value.

Logic block 604 illustrates obtaining a key value. In an embodiment, authenticate 110, and in particular OTPT 111, executed by computing device 102 performs this function. In an embodiment, OTPT 111 retrieves a key value 221 as illustrated in FIG. 3. In an embodiment, key value 221 may be stored in a computer readable storage medium of computing device 102. In an embodiment, key value 221 is a cryptography key that is the same key used by the computing device providing the OTP value, such as key value 211.

Logic block 605 illustrates obtaining a counter value from the selected counter. In an embodiment, authenticate 110, and in particular OTPT 111, executed by computing device 102 performs this function. In an embodiment, OTPT 111 retrieves a counter value 222a from the selected counter of counter set 112a as illustrated in FIG. 3. In an embodiment, counter value 212a may be stored in a computer readable storage medium of computing device 102.

Logic block 606 illustrates calculating a calculated one time password in response to the counter value and the key value. In an embodiment, OTPT 111 executed by computing device 102 performs this function. In an embodiment, calculate 223 uses key value 221 and counter value 222a to calculate an OTP value 234, or calculated OTP value. In an embodiment, calculate 223 is the same or similar to calculate 213 in computing device 106.

Logic block 607 illustrates comparing the calculated one time password with the received one time password. In an embodiment, OTPT 111 executed by computing device 102 performs this function. In an embodiment, compare 231 compares OTP value 234, or calculated OTP value, with OTP value 214a, or received OTP value.

Logic block 608 illustrating determining whether there is a match between the received OTP value and calculated OTP value. When a match occurs, control transitions to logic block 603 where another counter value, such as counter value 222b, is obtained from a different counter in the selected set of counters. Logic blocks 604 to 608 are repeated using another counter value. In an embodiment, OTPT 111 executed by computing device 102 performs this function. In an embodiment, logic block 608 represents remembering or storing the currently used counter that provides a counter value that results in a match between the received OTP value and calculated OTP value.

Logic block 609 illustrates outputting an authentication token when the calculated one time password value matches the received one time password value. In an embodiment, OTPT 111 and input/output 102e executed by computing device 102 performs this function. In an embodiment, a SAML token is output when the calculated OTP value matches the received OTP value. When all the counters in the assigned set of counters have been used to obtain a counter value and calculated OTP value and none of them match the received OTP value, a message may be output that indicates that authentication has failed.

Figure 7:
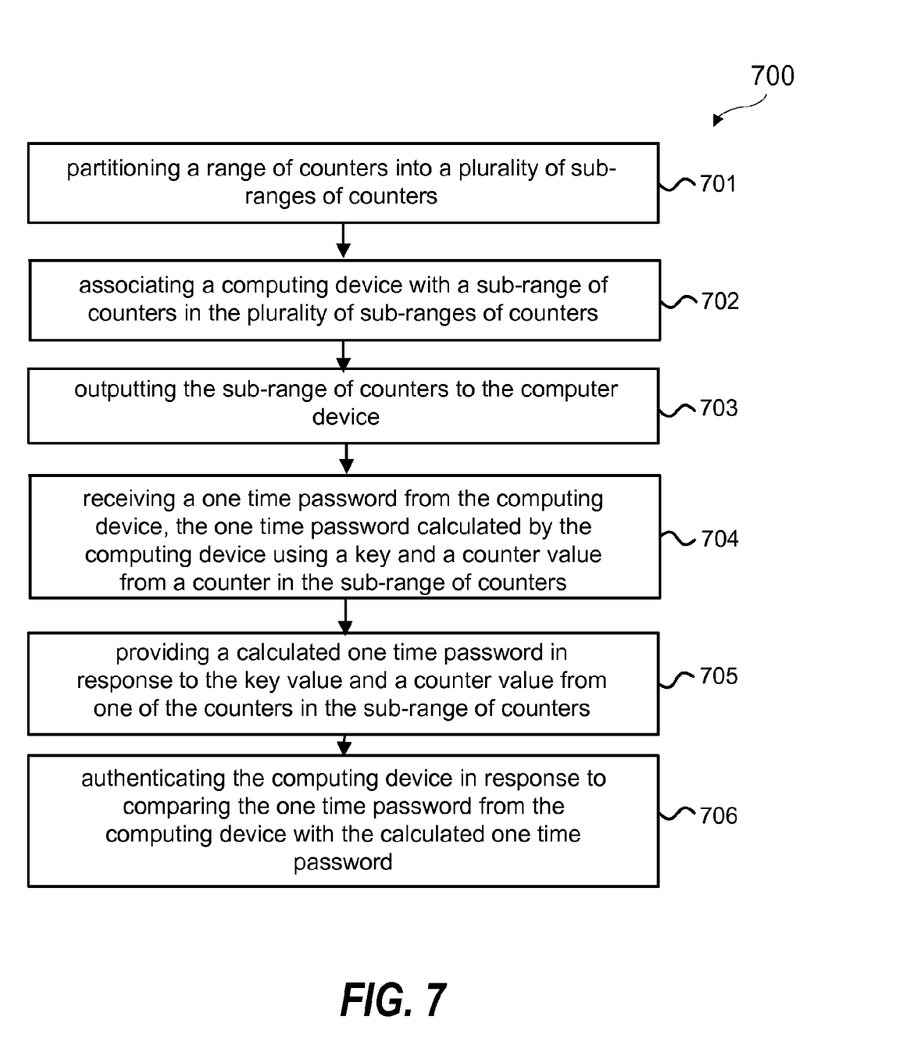
FIG. 7 illustrates a flowchart of an OTP method according to an embodiment.

FIG. 7 is a flowchart illustrating an OTP method 700 according to an embodiment. In an embodiment, computing device 102 shown in FIGS. 1-3 execute computer readable program code (or processor readable instructions), or portions thereof, to perform method 700. In an embodiment, computing device 102, embodied as an authentication server, performs method 600.

Logic block 701 illustrates partitioning a range of counters into a plurality of sub-ranges of counters. In an embodiment, authenticate 110 executed by computing device 102 performs this function. In an embodiment, partition 230 assigns or partitions counter sets 112a-n as illustrated in FIG. 4.

Logic block 702 illustrates associating a computing device with a sub-range of counters in the plurality of sub-ranges of counters. In an embodiment, authenticate 110 executed by computing device 102 performs this function. In an embodiment, partition 230 assigns or partitions counter sets 112a-n so that sets of counters are assigned to particular computing devices that provide OTP values. In an embodiment, a relational database is formed and stored in a computer readable storage medium of computing device 102, by partition 230, so that respective stored computing device names or identifications are associated with or assigned to a mutually exclusive set of counters in counter sets 112a-n.

Logic block 703 illustrates outputting the sub-range of counters to the computer device. In an embodiment, authenticate 110 and input/output 102e executed by computing device 102 performs this function.

Logic block 704 illustrates receiving a one time password from the computing device, the one time password calculated by the computing device using a key and a counter value from a counter in the sub-range of counters. In an embodiment, authenticate 110 and input/output 102e executed by computing device 102 performs this function.

Logic block 705 illustrates providing a calculated one time password in response to the key value and a counter value from one of the counters in the sub-range of counters. In an embodiment, authenticate 110 executed by computing device 102 performs this function. In an embodiment, calculate 223 executed by computing device 102 performs this function.

Logic block 706 illustrates authenticating the computing device in response to comparing the one time password from the computing device with the calculated one time password. In an embodiment, authenticate 110 and input/output 102e executed by computing device 102 performs this function.

Figure 8:
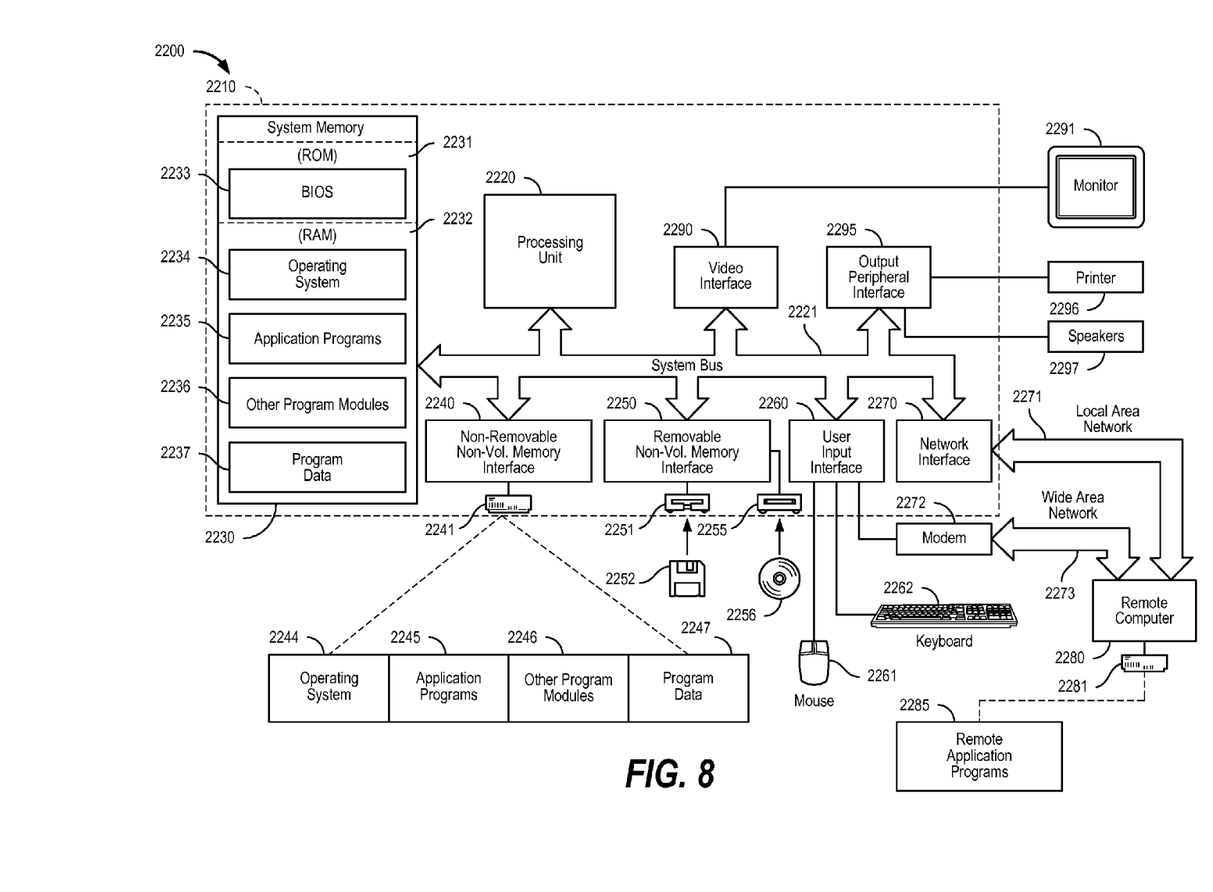
FIG. 8 is a block diagram of a computing device environment according to an embodiment.

The disclosed technology may be used with various computing systems or computing devices. FIG. 8 is a block diagram of an embodiment of a system environment 2200. Computing system environment 2200 includes a general purpose computing device in the form of a computer 2210. In embodiments, computing devices 106-108 as wells as computing devices 102-103 shown in FIG. 1 may include one or more components of computer 2210. In embodiments, computing devices 107 and 108 may be a cellular telephone and tablet, respectively, with similar mobile components. In embodiments, computing devices 102 and 103 may include one or more servers having one or more components in computer 2210.

Components of computer 2210 may include, but are not limited to, a processing unit (or core (s)) 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media or processor readable memory. Computer readable media can be any available media that can be accessed by computer 2210 and includes both volatile and nonvolatile media, removable and non-removable media. By way of example, and not limitation, computer readable media may comprise computer readable storage media. Computer readable storage media includes both volatile and nonvolatile, removable and non-removable media implemented in any method or technology for storage of information such as computer readable instructions, data structures, program modules or other data. Computer readable storage media includes, but is not limited to, RAM, ROM, electrically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer readable storage media in the form of volatile and/or nonvolatile memory such as ROM 2231 and RAM 2232. A basic input/output system (BIOS) 2233, containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application program(s) 2235, other program module(s) 2236, and program data 2237. In an embodiment, computer program code as described herein may be at least partially stored in application program(s) 2235. In an embodiment, protected service 103a shown in FIG. 1 corresponds to application program(s) 2235. In embodiments, software components shown in FIGS. 2 and 3, singly or in combination, corresponds to application(s) 2235 and/or program data 2237. In an embodiment, browser 201a and OTP 1116, shown in FIG. 2, corresponds to application(s) 2235. In an embodiment, authenticate 110 including OTP 111, shown in FIG. 2, corresponds to application(s) 2235.

The computer 2210 may also include other removable/non-removable, volatile/nonvolatile computer readable storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250. As one of ordinary skill in the art would appreciate, computer 2210 embodied as mobile computing device may not include all the components illustrated in FIG. 8, such as a magnetic disk drive 2251, etc.

The drives and their associated computer readable storage media described above provide storage of computer (processor) readable instructions, data structures, program modules and other data for the computer 2210. Hard disk drive 2241 is illustrated as storing operating system 2244, application program(s) 2245, other program module(s) 2246, and program data 2247. Note that these components can either be the same as or different from operating system 2234, application program(s) 2235, other program module(s) 2236, and program data 2237. Operating system 2244, application program(s) 2245, other program module(s) 2246, and program data 2247 are given different numbers here to illustrate that, at a minimum, they are different copies.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. In embodiments, computer 2210 includes input/output software and hardware to output and receive information from other computers on a network. For example, FIG. 8 illustrates a remote computer 2280 that may be a personal computer, a server, a router, a network PC, a peer device or other common network node, and typically includes many or all of the elements described above relative to the computer 2210. In an embodiment, one or more computing devices 102-103 and 106-108 shown in FIG. 1 correspond to remote computer 2280. In an embodiment, input/output software or program modules to transfer information on a network may be stored in network interface 2270 and/or modem 2272. In embodiments, other input/output software may be stored and executed in other components of computer 2210. The logical connections may include a LAN 2271 and a WAN 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application program(s) 2285 may reside on memory device 2281. It will be appreciated that the network connections shown are exemplary and other means of establishing a communications link between the computers may be used.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, component (hardware or software, or combination thereof), segment, or portion of code, which comprises one or more executable instructions for implementing the specified logical function(s). It should also be noted that, in some alternative implementations, the functions noted in the block may occur out of the order noted in the Figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method to authenticate, the method comprising:
   receiving, by a computing device of a plurality of computing devices of a user, a request for a one time password;
   automatically selecting, by the computing device and in response to the request, a counter to use in calculating the requested one time password, the selected counter being selected from a synchronous set of copied counters copied from a corresponding set of original counters maintained by an authenticator, the synchronous set of copied counters is a mutually exclusive set of counters assigned to the computing device among the plurality of computing devices of the user; the mutually exclusively set is a part of a larger superset of the original counters maintained by the authenticator, where no other counters except the assigned exclusive set of counters are downloaded from the authenticator to the computing device, said automatic selecting being carried out on one of a random, round robin or sequential basis from among the copied counters; wherein, the synchronous set of copied counters having at least three counters and a last selected counter is excluded from being selected by the computing device again;
   retrieving, by the computing device, a counter value from the selected counter;
   retrieving, by the computing device, a key value previously downloaded from the authenticator;
   calculating, by the computing device, the one time password as a function of the retrieved counter value and of the retrieved key value; and
   outputting, by the computing device, the calculated one time password.

2. The method of claim 1, further comprising:
   receiving, by the computing device, another request for another one time password;
   automatically further selecting, by the computing device and in response to the another request, another counter from the synchronous set of copied counters to use in calculating the requested another one time password,
   retrieving, by the computing device, another counter value from the selected another counter;
   retrieving, by the computing device, the key value;
   calculating, by the computing device, the another one time password as a function of the retrieved another counter value and of the key value; and
   outputting, by the computing device, the calculated another one time password.

3. The method of claim 1, wherein the larger superset of the original counters maintained by the authenticator is subdivided into a plurality of mutually exclusive subsets of counters, each subset being assigned to a respective potential request receiver including said computing device.

4. The method of claim 3, wherein the authenticator is implemented in an authentication server, the method further comprising:
   receiving, by the authentication server, the one time password output by the computing device;
   selecting, by the authentication server, the mutually exclusive subset of the original counters maintained by the authenticator for the computing device;
   retrieving, by the authentication server, a corresponding counter value from the mutually exclusive subset of the original counters maintained by the authenticator for the computing device;
   retrieving, by the authentication server, another key value corresponding to the key value retrieved by the computing device;
   calculating, by the authentication server, another one time password as a function of the corresponding counter value and of the another key value; and
   comparing, by the authentication server, the one time password with the another one time password to thereby determine whether to authenticate the one time password output by the computing device.

5. The method of claim 4, wherein the authentication server outputs an authentication token to an authentication requestor when the one time password matches the another one time password.

6. The method of claim 1, further comprising:
receiving, by another computing device of the plurality of computing devices of the user, another request for another one time password;
automatically further selecting, by the another computing device and in response to the another request, another counter from another set of counters to use in calculating the another one time password, the selected another counter being a synchronous copy of another original counter maintained by the authenticator, the synchronous copy of the another original counter having previously been downloaded from the authenticator to the another computing device, said automatic further selecting by the another computing device being carried out on one of a random, round robin or sequential basis from among copied counters previously downloaded to and maintained by the another computing device:
retrieving, by the another computing device, another counter value from the selected another counter;
retrieving, by the another computing device, another key value;
calculating, by the another computing device, the another one time password as a function of the retrieved another counter value and of the retrieved another key value; and
outputting, by the another computing device, the another one time password.

7. The method of claim 6, wherein the computing device and the another computing device are used by the user to access one or more applications for which access requires the outputting of the one time password and of the another one time password.

8. An apparatus comprising:
a hardware processor; and
a non-transitory computer readable storage medium storing processor executable program code, the processor executable program code being configured to cause the hardware processor to:
assign to each computing device of a plurality of computing devices of a user, one mutually exclusive set of counters, wherein the one mutually exclusive set of counters assigned to each computing device of the plurality of computing devices is different from one another;
output the one mutually exclusive set of counters to each corresponding computing device of the plurality of computing devices, wherein a mutually exclusively set of counters assigned to a given corresponding computing device is a part of a larger superset of counters, and no other counters of the larger superset except the mutually exclusive set of counters assigned to the corresponding device is outputted to the corresponding device, wherein each mutually exclusive set of counters has at least three counters, such that when a request for a one time password is received by any one of the plurality of computing devices, the receiving one of the plurality of computing devices can automatically select one of the at least three counters assigned to it, the selection being based on one of a random, round robin or sequential basis, wherein a last selected counter is excluded from being selected again;
receive a one time password value as a received one time password from the receiving one of the plurality of computing devices;
select a counter among the one mutually exclusive set of counters assigned to the receiving one of the plurality of computing devices;
obtain a counter value from the selected counter;
obtain a key value, to calculate a calculated one time password as a function of the obtained counter value and of the obtained key value;
compare the calculated one time password with the received one time password; and
output an authentication token when the calculated one time password matches the received one time password.

9. The apparatus of claim 8, wherein the processor executable program code is configured to cause the hardware processor to select another counter in the mutually exclusive set of counters assigned to the given corresponding computing device, to calculate another calculated one time password as a function of an another counter value obtained from the selected another counter and as a function of the key value, to compare the another calculated one time password with the received one time password value, and to output an authentication token when the another calculated one time password matches the received one time password value.

10. The apparatus of claim 8, wherein the mutually exclusively set of counters assigned to a given corresponding computing device includes a copied counter that is used by the given corresponding computing device to provide the one time password value that is received as the one time password.

11. The apparatus of claim 8, wherein the apparatus is embodied in an authentication server and the authentication token is a security assertion markup language token.

12. A computer program product, comprising:
a non-transitory computer readable storage medium having computer readable program code embodied therewith, the computer readable program code comprising:
computer readable program code configured to cause a processor to partition a range of counters into a plurality of mutually exclusive sub-ranges of counters, each sub-range having at least three counters, and each sub-range is different from one another;
computer readable program code configured to cause the processor to associate each computing device of a plurality of computing devices of a user with a corresponding mutually exclusive sub-range of counters in the plurality of mutually exclusive sub-ranges of counters;
computer readable program code configured to cause the processor, when outputting copies of the counters, to only output a copy of each corresponding mutually exclusive sub-range of counters to each of the associated computing device of the plurality of computing devices of the user and to not output to each of associated computing device of the plurality of computing devices of the user any other sub-ranges of counters;
computer readable program code configured to cause the processor to receive a one time password from an associated computing device of the plurality of computing devices of the user, the one time password having been calculated by the associated computing device using a key and a counter value from an automatically selected counter in the copied corresponding mutually exclusive sub-range of counters, the automatic selecting being performed on one of a random, round robin or sequential basis, wherein a last selected counter is excluded from being selected again;

computer readable program code configured to cause the processor to provide a calculated one time password as a function of a key value and of a counter value from one of the at least three counters in the mutually exclusive sub-range of counters corresponding to the associated computing device; and computer readable program code configured to authenticate the associated computing device of the plurality of computing devices of the user in response to comparing the one time password received from the associated computing device with the calculated one time password.

13. The computer program product of claim 12, wherein the computer readable program code that is configured to cause the processor to output each corresponding mutually exclusive sub-range of counters to each of the computing device of the plurality of computing devices of the user is configured to cause the processor to download one time password token computer readable program code, to the associated computing device, where the token computer readable program code is to be executed to calculate the one time password.

14. The computer program product of claim 12, wherein the computer readable program code that is configured to cause the processor to partition the range of counters into the plurality mutually exclusive sub-ranges of counters comprises computer readable program code configured to partition the range of counters into a plurality of contiguous mutually exclusive sub-ranges of counters.

15. The computer program product of claim 12, wherein the non-transitory computer readable storage medium is embodied in an authentication server that is configured to receive the one time password from the associated computing device.

* * * * *